US012099593B2

(12) United States Patent
Golombek et al.

(10) Patent No.: US 12,099,593 B2
(45) Date of Patent: Sep. 24, 2024

(54) AUTHENTICATION OF INTEGRATED CIRCUITS

(71) Applicant: Arm Limited, Cambridge (GB)

(72) Inventors: Oded Golombek, Even Yehuda (IL); Einat Luko, Herzliya (IL)

(73) Assignee: Arm Limited, Cambridge, MA (US)

( * ) Notice: Subject to any disclaimer, the term of this patent is extended or adjusted under 35 U.S.C. 154(b) by 700 days.

(21) Appl. No.: 17/245,371

(22) Filed: Apr. 30, 2021

(65) Prior Publication Data
US 2022/0350875 A1    Nov. 3, 2022

(51) Int. Cl.
*G06F 21/00* (2013.01)
*G06F 21/44* (2013.01)
*G06F 21/62* (2013.01)

(52) U.S. Cl.
CPC .......... *G06F 21/44* (2013.01); *G06F 21/6209* (2013.01)

(58) Field of Classification Search
CPC ............................ G06F 21/44; G06F 21/6209
See application file for complete search history.

(56) References Cited

U.S. PATENT DOCUMENTS

| 5,142,579 A | * | 8/1992 | Anderson | H04L 9/3093 380/30 |
| 2016/0072779 A1 | * | 3/2016 | Medwed | H04L 9/0618 713/171 |
| 2019/0207775 A1 | * | 7/2019 | Nishimae | H04L 9/088 |

* cited by examiner

*Primary Examiner* — Rodman Alexander Mahmoudi
(74) *Attorney, Agent, or Firm* — Leveque Intellectual Property Law, P.C.

(57) ABSTRACT

A method for authenticating an integrated circuit is provided. At an intellectual property facility, a random encryption key and a number of random input vectors are generated. For each input vector, the input vector is encrypted, based on the encryption key, to generate a corresponding output vector, and the input vector and the corresponding output vector are formed into an authentication vector pair. The encryption key is embedded into hardware description language instructions that define an integrated circuit that includes a cryptography engine. A number of authentication vector pairs is transmitted, via a secure communication link, to a semiconductor assembly and test facility. An input vector of an authentication vector pair is presented to the integrated circuit, which encrypts the input vector using the embedded encryption key. If the result matches the output vector of the authentication vector pair, the integrated circuit is determined to be authentic.

20 Claims, 5 Drawing Sheets

AUTHENTICATION OF INTEGRATED CIRCUITS

BACKGROUND

The present disclosure relates to integrated circuits manufacturing process. More particularly, the present disclosure relates to cryptographic authentication of integrated circuits.

A secure element of an integrated circuit (IC), e.g., a complete integrated circuit such as a full system-on-a-chip (SoC) or a portion of an integrated circuit designed for placement in one or more larger chip designs known as a "Hard Macro" (HM), may be designed and generated in a secure room at an intellectual property (IP) facility, fabricated within a secure environment at a fabrication facility and delivered to a secure semiconductor assembly and test (SAT) facility, such as an outsourced semiconductor assembly and test (OSAT) facility, to undergo provisioning of sensitive assets. It is desirable to have the integrated circuit with the secure element fabricated as an "open sample" (i.e., open for debugging and testing) to reduce the integration, manufacturing and testing cost of the integrated secure element and allow software development on the final silicon, instead of on a simulator, field-programmable gate array (FPGA), or other alternative.

However, in the gap between the fabrication facility and the SAT secure environments, the integrated circuit with the secure element is prone to attack, including analysis, study, reverse engineering, experimentation and eventually the cloning of the behavior of all interfaces. The attacker may then create counterfeit integrated circuits substantially cloning the behavior of the integrated circuit with the sensitive element but having weakened security (e.g., a security backdoor) or other undesired features (e.g., features that may be perceived by the user as quality defects, such as intermittent operation); such counterfeit integrated circuits may be inserted surreptitiously into the manufacturing flow of the integrated circuit with the sensitive element.

DETAILED DESCRIPTION

Figure 1A:
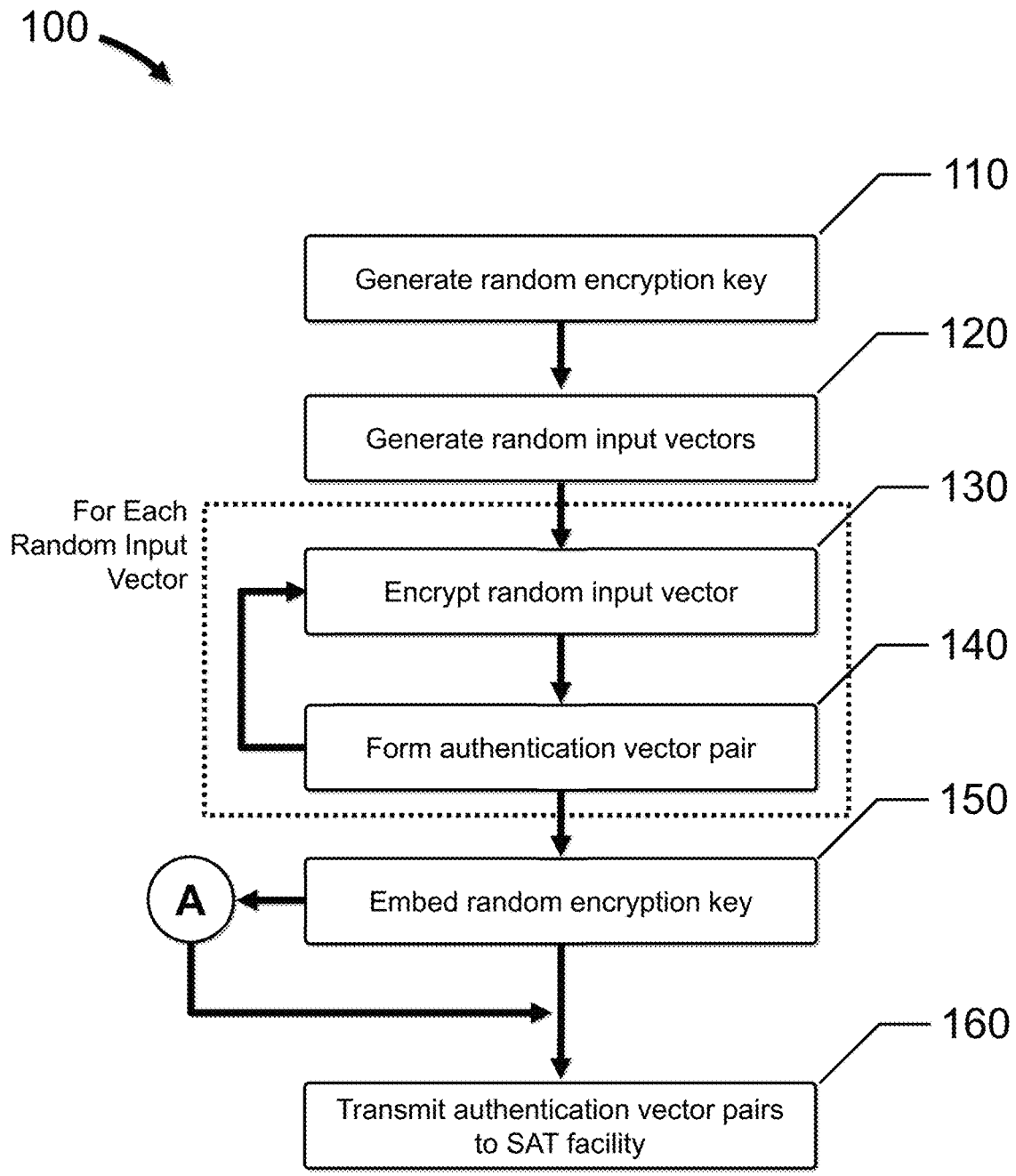
FIGS. 1A and 1B depict flow diagrams representing functionality associated with authenticating an integrated circuit, in accordance with embodiments of the present disclosure.

Embodiments of the present disclosure will now be described with reference to the drawing figures, in which like reference numerals refer to like parts throughout.

A method and apparatus for low-cost and secure authentication of an integrated circuit with a sensitive element is therefore desirable. The authentication method should be strong enough to resist sophisticated cloning attempts, and be fully automated to allow economical provisioning of a large number of units.

Embodiments of the present disclosure advantageously provide a method and apparatus for authenticating an integrated circuit. More particularly, embodiments of the present disclosure advantageously provide an automated authentication method that supports the fabrication of open (i.e., open for debugging and testing) integrated circuits at low cost, while detecting inauthentic integrated circuits that may be placed into the manufacturing process by an attacker, thereby enhancing security.

In certain embodiments, an integrated circuit is designed and generated in a secure environment at an IP facility, fabricated within a secure environment at a fabrication facility and delivered to a semiconductor assembly and test facility to undergo final assembly, test, and provisioning of sensitive assets within a secure environment. The integrated circuit may be an entire integrated circuit, e.g., a SoC, or, in other embodiments, a portion of an integrated circuit designed to be merged into one or more larger IC designs, e.g., an HM.

In some embodiments, the secure environment at the IP facility includes a hardware security module (HSM), which is a tamper-resistant, physical computing device with one or more secure cryptoprocessors that securely performs cryptographic functions (e.g., encryption), securely generates, manages, stores and destroys digital keys and contains a secure entropy source suitable for the generation of random encryption keys and other random sequences (e.g., test vectors).

In certain embodiments, at the IP facility, portions of the design are created and simulated at the register-transfer level (RTL) of abstraction, using instructions of a hardware description language (HDL) that define the integrated circuit, e.g., Verilog or VHDL, then implemented using standard logic cells compatible with the fabrication process of the fabrication facility. The completed design database is then generated in a standard file format, e.g., the Graphic Design System II (GDSII) or the Open Artwork Systems Interchange Standard (OASIS) file format.

Figure 1B:
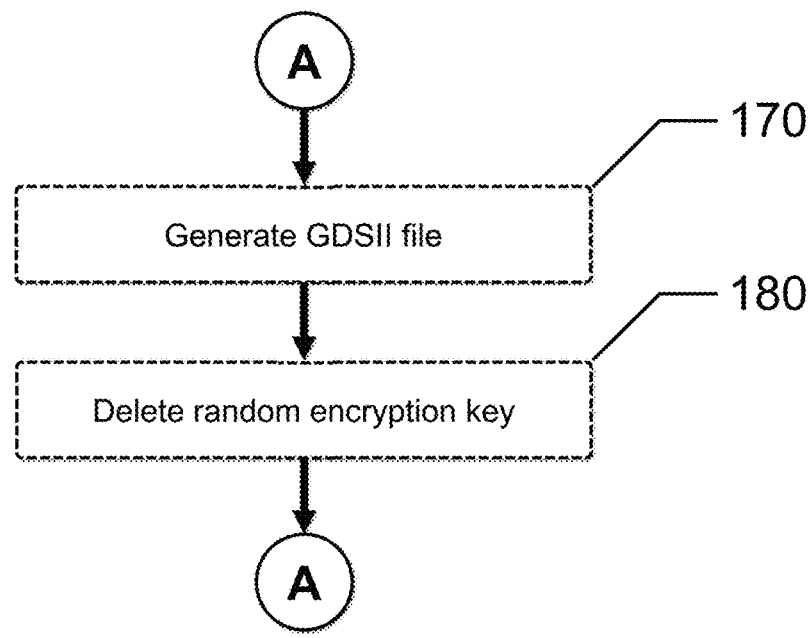

FIGS. 1A and 1B depict flow diagram 100 representing functionality associated with authenticating an integrated circuit, in accordance with embodiments of the present disclosure. The functionality is performed in a secure environment at an IP facility.

At 110, a random encryption key is generated, using, for example, a secure entropy source. In certain embodiments, the random encryption key is generated at an HSM, using the secure entropy source of the HSM as discussed supra. The random encryption key has a specific length, e.g., 128 bits, although other lengths, e.g., 192 bits, 256 bits, etc., may be used. The random encryption key is confidential, and, in certain embodiments, may be kept at the HSM.

At 120, a number of random input vectors is generated, using, for example, a secure entropy source. In certain embodiments, the random input vectors are generated at an HSM, using the secure entropy source of the HSM, as discussed supra. Each of the random input vectors has a specific bit length, e.g., 128 bits, although other lengths, e.g., 192 bits, 256 bits, etc., may be used. The random input vectors are confidential, and, in certain embodiments, may be kept at the HSM. At least one random input vector is generated, and additional random input vectors may be generated as desired.

The functionality at 130 and 140 is performed for each input vector.

At 130, the random input vector is encrypted, using the random encryption key generated at 110, to generate a corresponding output vector. The output vector has a specific bit length, e.g., 128 bits, although other bit lengths, e.g., 192 bits, 256 bits, etc., may be used. In certain embodiments, the random input vector is encrypted using an Advanced Encryption Standard-Electronic Code Book (AES-ECB) operation, the random input vector is an AES code block, the output vector is an AES code block, and the random input vector and the output vector have a length of 128 bits. In certain embodiments, other cryptographic block ciphers may be used. In many embodiments the encryption is performed at the HSM. The output vector is confidential and, in certain embodiments, may be kept at the HSM.

At 140, the random input vector and its associated output vector are formed into an authentication vector pair. The authentication vector pair is confidential, and, in certain embodiments, may be kept at the HSM. If there are random input vectors remaining, flow returns to 130; if no random input vectors remain, flow continues to 150.

At 150, the random encryption key is embedded into hardware description language (HDL) instructions defining an integrated circuit (IC) that includes a debug port and a cryptography engine. The random encryption key is embedded within the "sea-of-gates" of the IC, and, in certain embodiments, obfuscated with many, e.g., thousands, of additional redundant bits. The cryptography engine includes a core coupled to a secure register that is configured to load the embedded encryption key. The secure register is accessible only by the core; in other words, the secure register is not readable or accessible by the debug port or any other interface. In many embodiments, flow proceeds to 160. In certain embodiments, flow proceeds to 170 (FIG. 1B).

At 160, a number of authentication vector pairs is securely transmitted to a SAT facility. A single set of authentication vector pairs may be transmitted to different secure rooms at a single SAT facility, or each room may be sent a different set. A single set of authentication vector pairs may be transmitted to different SAT facilities, or each facility may be sent a different set. Regardless, at least one authentication vector pair must be transmitted per SAT facility secure room. The number of authentication vector pairs transmitted to a SAT facility may therefore be less than the number of random input vectors.

At 170, in certain embodiments, the completed design database of the IC is generated in a standard file format, e.g., the Graphic Design System II (GDSII) format, based on the HDL instructions in which the random encryption key is embedded. Flow then proceeds to 180.

At 180, in certain embodiments, the random encryption key is deleted from the HSM and all other storage components, other than the GDSII file. Flow then proceeds to 160.

In some embodiments, at the fabrication facility, the design of the IC is securely received from the IP facility and then merged into the design of a larger integrated circuit received from, e.g., a third-party integrated circuit vendor. In other embodiments, the design of the IC is securely received from the IP facility and not merged. In either case, the design then goes into mask data preparation, in which the design database is used to generate instructions suitable for generating a mask set. The instructions are then sent to a mask shop. In some embodiments, the mask shop is within the fabrication facility, while in other embodiments, the mask shop operation is performed by a vendor. Following receipt of the mask set at the fabrication facility, a plurality of semiconductor wafers, each containing a plurality of copies of the IC, is manufactured. At least a portion of one of these wafers is then sent to a SAT facility.

Figure 2:
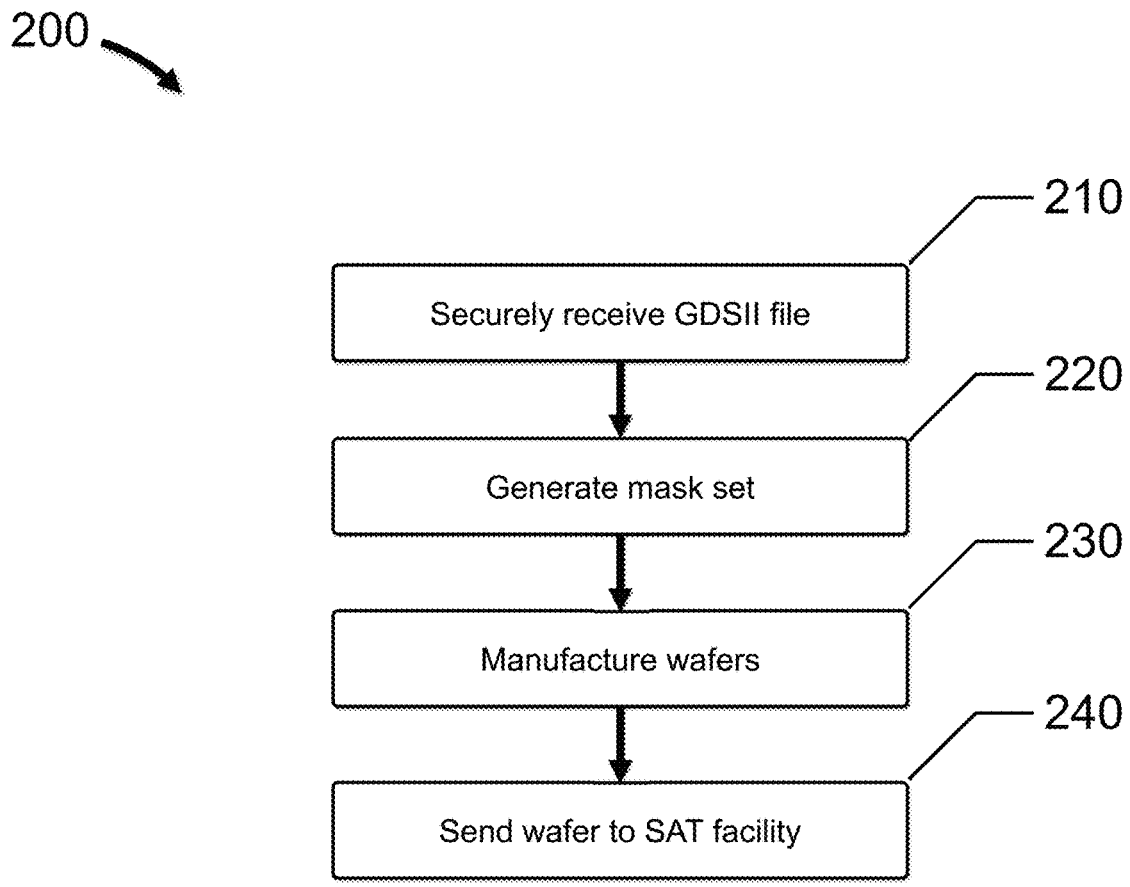
FIG. 2 depicts a flow diagram representing functionality associated with authenticating an integrated circuit, in accordance with an embodiment of the present disclosure.

FIG. 2 depicts a flow diagram 200 representing functionality associated with authenticating an integrated circuit, in accordance with an embodiment of the present disclosure. The functionality is performed in a secure environment at a fabrication facility.

At 210, the design database of the IC is securely received from the IP facility. In certain embodiments, the design database is in the GDSII format, as described supra.

At 220, a mask set is generated from the design database received at 210. The mask set may be generated at the fabrication facility, or, in certain embodiments, by a vendor. In certain embodiments, the design database is in the GDSII format, as described supra.

At 230, a plurality of wafers is manufactured based on the mask set generated at 220. Each wafer includes a number of integrated circuits.

At 240, at least one wafer manufactured at 230 is sent to a SAT facility. As discussed supra, due to cost concerns this shipment is made insecurely.

In certain embodiments, at a secure room of the SAT facility, the shipment of at least one wafer is received and prepared for wafer testing, packaging, final testing, and provisioning. At wafer testing, each integrated circuit on each wafer is tested to identify defective or out-of-specification parts, which are marked and later securely destroyed. Unmarked parts passing wafer testing are packaged, and each packaged part is again tested at final testing, to identify parts having defects either not present or not tested at wafer testing. Parts failing final testing are securely destroyed. In certain embodiments, parts passing final testing are burned-in (i.e., operated for a period of time, generally at an elevated ambient temperature), and then re-tested. Parts passing final testing, and, if performed, the re-test, are provisioned with sensitive assets, e.g., data and executable instructions.

Because the wafers are shipped insecurely from the fabrication facility to the SAT, there may be wafers of clones (counterfeit, inauthentic integrated circuits) among the wafers of authentic integrated circuits, or even individual wafers having both authentic and inauthentic integrated circuits present. Provisioning the sensitive assets into a clone would allow the exposure of the assets once the clone leaves the SAT secure room. Therefore, the SAT secure room must identify a clone and authenticate a genuine integrated circuit.

Figure 3:
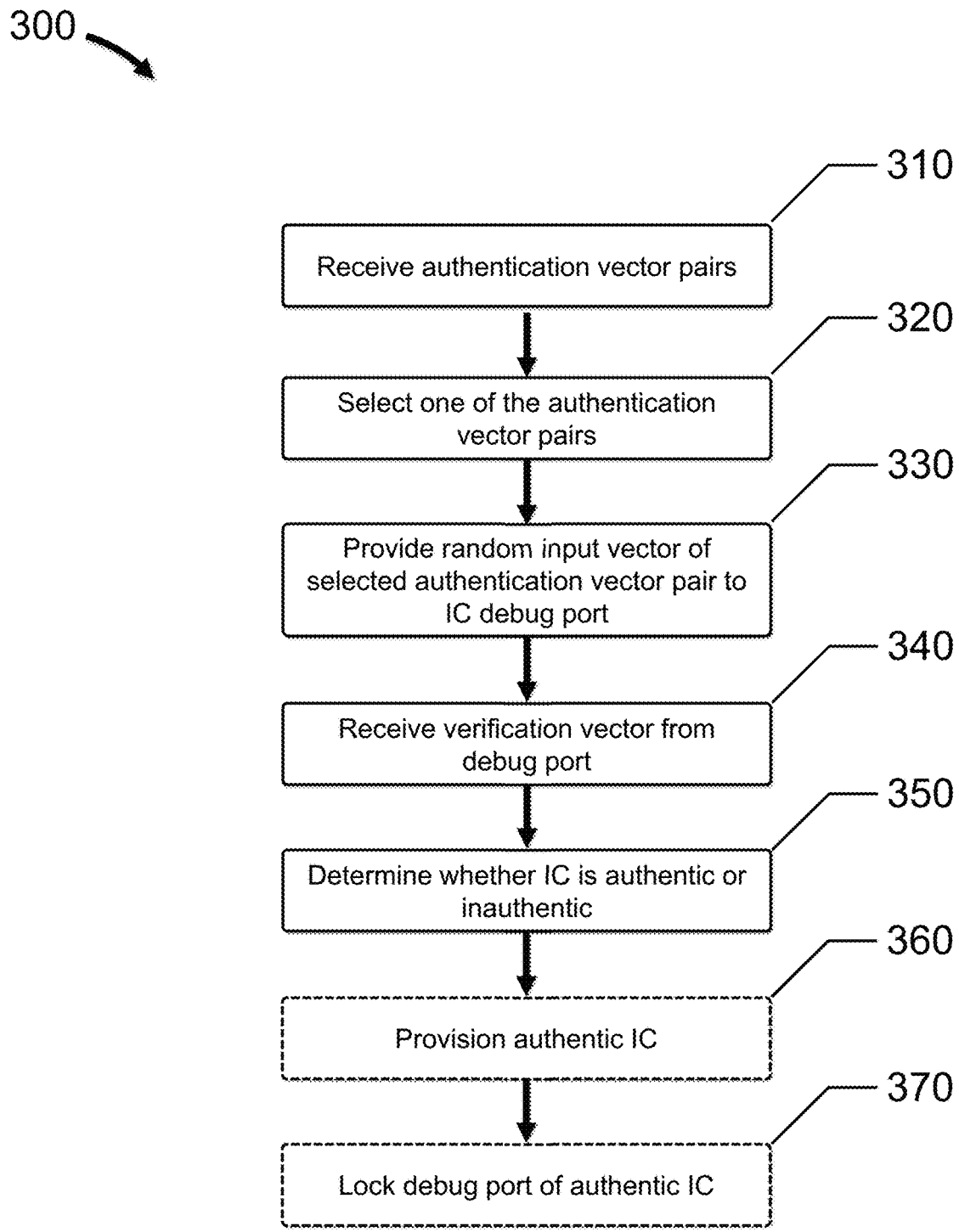
FIG. 3 depicts a flow diagram representing functionality associated with authenticating an integrated circuit, in accordance with an embodiment of the present disclosure.

FIG. 3 depicts flow diagram 300 representing functionality associated with authenticating an integrated circuit, in accordance with an embodiment of the present disclosure. The functionality is performed in a secure environment at a SAT facility.

At 310, a number of authentication vector pairs is received, via a secure communication link, from an IP facility. As described supra regarding 130 and 140 of FIG. 1, each authentication vector pair includes a random input vector and a corresponding output vector generated by encrypting the random input vector using a random encryption key. At the IP facility, in certain embodiments, each random input vector was encrypted using an AES-ECB operation. The random input vectors are AES code blocks, and the output vectors also are AES code blocks, each having a length of 128 bits or larger. In other embodiments, each random input vector may be encrypted using another block cipher.

Returning to FIG. 3, at 320, one of the authentication vector pairs is selected. In many embodiments, the selection may be random or pseudorandom, while in other embodiments, the selection may be deterministic. A deterministic selection may be based, for example, on a rule, policy, algorithm, dependency on an identifier (such as the mask IDs), etc.

At 330, the random input vector of the selected authentication vector pair is provided to a debug port of an integrated circuit.

Figure 4:
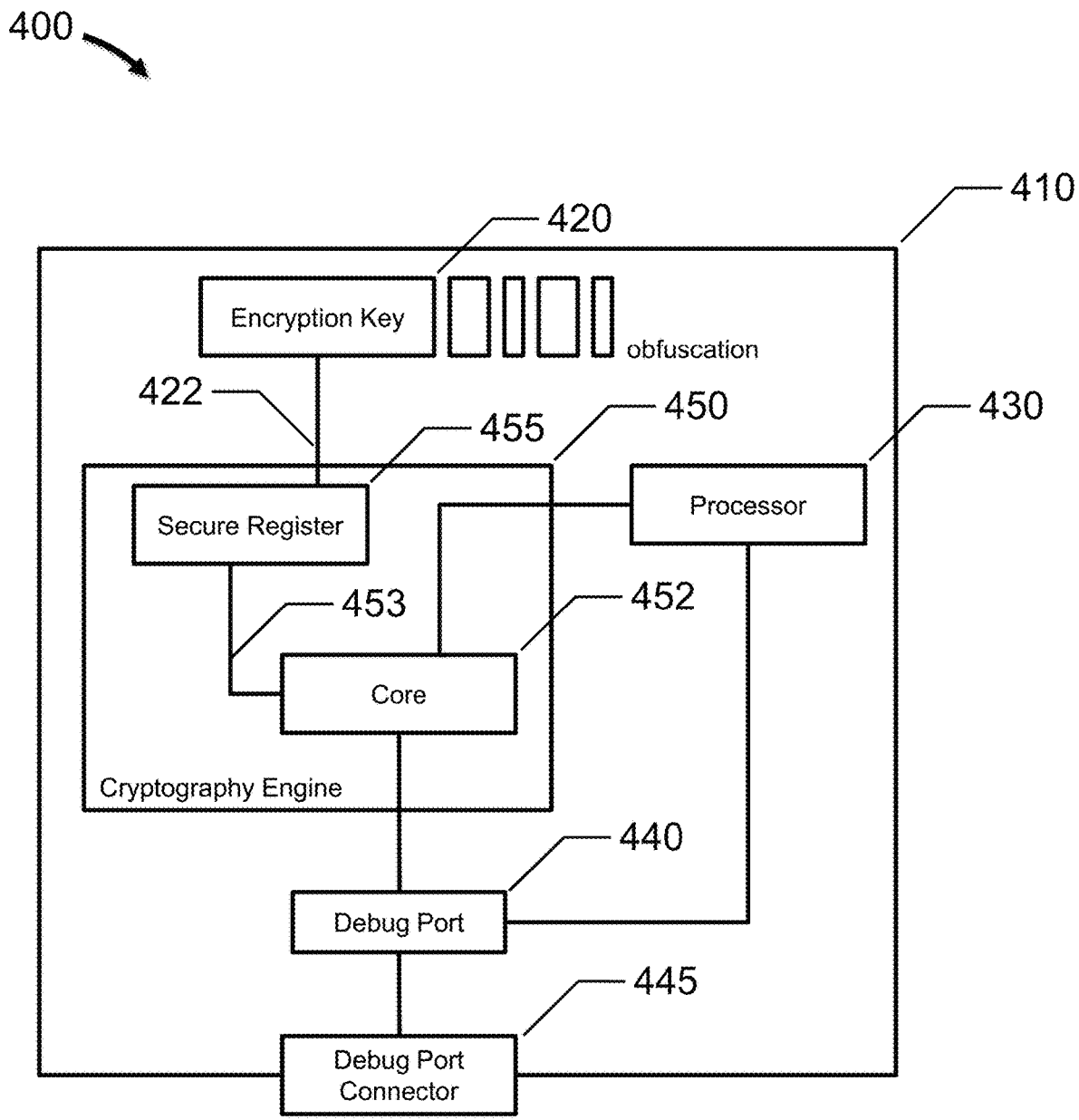
FIG. 4 depicts a block diagram of an authenticatable integrated circuit, in accordance with an embodiment of the present disclosure.

FIG. 4 depicts a block diagram 400 of an authenticatable integrated circuit 410, in accordance with an embodiment of the present disclosure. In authenticatable integrated circuit 410, the random input vector of the selected authentication vector pair, e.g., an AES code block of length 128 bits, is provided to debug port 440 via debug port connector 445. In certain embodiments debug port 440 is lockable.

Authenticatable integrated circuit 410 includes embedded encryption key 420, processor 430, debug port 440, debug port connector 445 coupled to debug port 440, and cryptography engine 450. Generally, cryptography engine 450 is coupled to embedded encryption key 420, processor 430 and debug port 440, and includes, inter alia, core 452 and secure register 455. Core 452 provides various cryptographic functions, such as, for example, encryption and decryption, message authentication, hashing operations, ciphering operations, etc., and may be a hardware module. Core 452 may include memory configured to store data, or, alternatively, cryptography engine 450 may include memory, coupled to core 452, to store data.

Connection 453 couples secure register 455 to core 452. In many embodiments, connection 453 is a set of traces, metal runners, patterned metal layers, connection pads, vias, etc., that directly connects secure register 455 to core 452, such as, for example, a secure or unsecure bus, etc.

Secure register 455 is configured to load (and store) embedded encryption key 420. Advantageously, embedded encryption key 420 may be loaded into secure register 455 because secure register 455 is accessible only by core 452. In other words, secure register 455 is not accessible via an interface that is external to cryptography engine 450, such as, for example, an IC external interface (e.g., debug port 440), a CPU interface (e.g., processor 430), a memory-mapped interface (e.g., a memory address), etc. In certain embodiments, secure register 455 may be accessible by other components of cryptography engine 450 (not depicted for clarity).

Secure register 455 is coupled to embedded encryption key 420 via connection 422. In many embodiments, connection 422 is a set of traces, metal runners, patterned metal layers, connection pads, vias, etc., that directly connects secure register 455 to the individual bits of embedded encryption key 420. In many embodiments, secure register 455 automatically loads embedded encryption key 420 after an IC reset. In other embodiments, core 452 specifically instructs or enables secure register 455 to load embedded encryption key 420.

In certain embodiments, cryptography engine 450 is operable as an AES engine and includes mitigations against side-channel attacks (e.g., timing, power consumption, electromagnetic leakage, sound, etc.), fault injection (e.g., clock, electromagnetic, voltage, etc.) and physical probing (e.g., invasive attacks, etc.) that protect embedded encryption key 420. As discussed above, embedded encryption key 420 is embedded at the RTL of the design, within the "sea-of-gates" of the IC, and, in certain embodiments, the bits of embedded encryption key 420 are obfuscated with many, e.g., thousands, of additional redundant bits, as suggested by the extended blocks adjacent to embedded encryption key 420 depicted in FIG. 4.

In certain embodiments, debug port 440 is configured to write the random input vector of the selected authentication vector pair, provided to debug port 440 via debug port connector 445, into cryptography engine 450. In other embodiments, debug port 440 is configured to write the random input vector of the selected authentication vector pair into cryptography engine 450, and to instruct cryptography engine 450 to perform the encryption operation.

In still other embodiments, debug port 440 is configured to inform processor 430 of the presence of the random input vector of the selected authentication vector pair, in response to the providing of the random input vector of the selected authentication vector pair to debug port 440 via debug port connector 445, and processor 430 is configured to copy the random input vector of the selected authentication vector pair from debug port 440 into cryptography engine 450 and instruct cryptography engine 450 to perform the encryption operation. In still other embodiments, processor 430 is configured to execute an instruction to begin the encryption operation, and instruct cryptography engine 450 to copy the random input vector of the selected authentication vector pair from debug port 440 into cryptography engine 450 and perform the encryption operation. Other embodiments are possible while staying in scope of the present disclosure.

Cryptography engine 450 performs the encryption operation on the random input vector of the selected authentication vector pair received from debug port 440, using the embedded encryption key 420 stored in secure register 455 and employing core 452.

When core 452 completes the encryption operation, cryptography engine 450 provides the output, the verification vector, to debug port 440, where it may be received externally via debug port connector 445. When AES-ECB encryption is used, the verification vector is an AES code block of length 128 bits.

Returning to FIG. 3, at 340, a verification vector is received from the debug port. As described supra, the verification vector is the output of the encryption operation performed on the random input vector of the selected authentication vector pair, using the embedded encryption key obfuscated at the RTL level. When AES-ECB encryption is used, the output vector is an AES code block of length 128 bits.

At 350, the integrated circuit is determined to be authentic or inauthentic, by comparing the verification vector to the output vector of the selected authentication vector pair. As the output vector and the verification vector were, ostensibly, generated by performing the same encryption operation on the same random input vector of the selected authentication vector pair using the same random encryption key, the output vector and the verification vector should match in an authentic integrated circuit. Therefore, if the output vector and the verification vector match, the integrated circuit is determined to be authentic. If the output vector and the verification vector do not match, the integrated circuit is determined to be inauthentic.

This determination relies on the confidentiality of the embedded encryption key during the time the wafers are exposed to study via the debug port. The authentication vector pairs also are confidential, so an attacker cannot generate or mimic the output vectors.

At 360, in certain embodiments, an authentic integrated circuit is provisioned with sensitive assets, such as, for example, data, executable instructions, secrets belonging to service providers or relying parties, etc. Data may include, for example, account and personal identifiers, passwords, settings of wireless devices (e.g., cellular telephones, Wi-Fi, Bluetooth, etc.), web browser cookies and histories, and other confidential items. Executable instructions may include those associated with operating systems, programs, applications, browser plug-ins, scripts, etc. In certain embodiments, an inauthentic integrated circuit is securely destroyed.

In many embodiments, provisioning occurs at the SAT facility. In some embodiments, after the integrated circuits are tested, assembled and packaged, the packaged integrated circuits may be sent to a different facility for the authenticity verification followed by the secure provisioning of the sensitive assets.

At 370, in certain embodiments, the debug port of an authentic integrated circuit is locked after it is provisioned with data and/or executable instructions. Once the debug port is locked, the embedded encryption key is no longer available. Locking the debug port may occur at the SAT facility or a different facility, as described above.

The embodiments described above and summarized below are combinable.

In one embodiment, a method for authenticating an integrated circuit includes, at an intellectual property (IP) facility, generating a random encryption key including a number of bits; generating a number of random input vectors, each random input vector including a number of bits; for each random input vector, encrypting the random input vector, based on the random encryption key, to generate a corresponding output vector that includes a number of bits, and forming the random input vector and the corresponding output vector into an authentication vector pair; embedding the random encryption key into hardware description language (HDL) instructions defining an integrated circuit that includes a debug port and a cryptography engine with a core coupled to a secure register that is configured to load the embedded encryption key, the secure register accessible only by the core; and transmitting, via a secure communication link, a number of authentication vector pairs to a semiconductor assembly and test (SAT) facility.

In another embodiment of the method, each random input vector is encrypted using an Advanced Encryption Standard (AES) electronic code book (ECB) operation, the random input vectors are AES code blocks, the output vectors are AES code blocks, and the cryptography engine is an AES engine that performs the AES ECB operation.

In another embodiment of the method, a hardware security module (HSM) generates the random encryption key, generates the number of random input vectors, encrypts the random input vectors and forms the authentication vector pairs; and the random encryption key has 128 bits, each random input vector has 128 bits, and each output vector has 128 bits.

In another embodiment of the method, the number of authentication vector pairs transmitted to the SAT facility is less than the number of random input vectors.

In another embodiment of the method, embedding the random encryption key includes obfuscating the random encryption key within the HDL instructions using a plurality of redundant bits.

In another embodiment of the method, the method further includes deleting the random encryption key from a memory of the HSM after said embedding the random encryption key.

In another embodiment of the method, the method further includes, at the IP facility, generating a Graphic Design System II (GDSII) file based, at least in part, on the HDL instructions; at a fabricator facility, securely receiving the GDSII file from the IP facility; generating a mask set based on the GDSII file; manufacturing a plurality of wafers based on the mask set, each wafer including a plurality of the integrated circuits; and sending at least one wafer to the SAT facility.

In another embodiment of the method, the method further includes, at the SAT facility, receiving, via the secure communication link, the authentication vector pairs from the IP facility; receiving the wafer from the fabricator facility; and authenticating at least one integrated circuit on the wafer using at least one authentication vector pair.

In one embodiment, an additional method for authenticating an integrated circuit includes, at a semiconductor assembly and test (SAT) facility, receiving, via a secure communication link, a number of authentication vector pairs from an intellectual property (IP) facility, each authentication vector pair including a random input vector and a corresponding output vector generated by encrypting the random input vector using a random encryption key; selecting one of the authentication vector pairs; providing the random input vector of the selected authentication vector pair to a debug port of an integrated circuit, the integrated circuit including the debug port, an embedded encryption key that matches the random encryption key, and a cryptography engine with a core coupled to a secure register that is configured to load the embedded encryption key, the secure register accessible only by the core; receiving a verification vector from the debug port of the integrated circuit, the verification vector generated by the cryptography engine by encrypting the random input vector of the selected authentication vector pair using the embedded encryption key; and determining whether the integrated circuit is an authentic or inauthentic.

In another embodiment of the additional method, determining whether the integrated circuit is an authentic or inauthentic includes determining the integrated circuit to be an authentic integrated circuit when the verification vector matches the output vector of the selected authentication vector pair, and determining the integrated circuit to be an inauthentic integrated circuit when the verification vector does not match the output vector of the selected authentication vector pair.

In another embodiment of the additional method, each random input vector is encrypted using an Advanced Encryption Standard (AES) electronic code book (ECB) operation, the random input vectors are AES code blocks, the output vectors are AES code blocks, the verification vector is an AES code block, and the cryptography engine is an AES engine that performs the AES ECB operation.

In another embodiment of the additional method, the random encryption key has 128 bits, each random input vector has 128 bits, and each output vector has 128 bits.

In another embodiment of the additional method, the embedded encryption key is obfuscated within the integrated circuit using a plurality of redundant bits.

In another embodiment of the additional method, the additional method further includes provisioning the authentic integrated circuit, and locking the debug port of the integrated circuit after said provisioning.

In another embodiment of the additional method, the additional method further includes, at the intellectual property (IP) facility, generating the random encryption key; generating a number of random input vectors; generating a plurality of authentication vector pairs based on the random encryption key and the number of random input vectors; transmitting, via the secure communication link, the number of authentication vector pairs to the SAT facility, the number of authentication vector pairs being less than the number of random input vectors; and embedding the random encryption key into hardware description language (HDL) instructions defining the integrated circuit.

In another embodiment of the additional method, the additional method further includes, at the IP facility, generating a Graphic Design System II (GDSII) file based, at least in part, on the HDL instructions; at a fabricator facility, securely receiving the GDSII file from the IP facility; generating a mask set based on the GDSII file; manufacturing a plurality of wafers based on the mask set, each wafer including a plurality of the integrated circuits; and sending at least one wafer to the SAT facility.

In one embodiment, an authenticatable integrated circuit includes an embedded encryption key; a debug port configured to receive a random input vector of an authentication vector pair and output a verification vector, the authentication vector pair including the random input vector and a corresponding output vector generated by encrypting the random input vector using a random encryption key that matches the embedded encryption key; a cryptography engine, coupled to the debug port, including a core coupled to a secure register that is configured to load the embedded encryption key, the secure register accessible only by the core, the cryptography engine configured to receive, from the debug port, the random input vector of the authentication vector pair, encrypt the random input vector of the selected authentication vector pair using the embedded encryption key stored in the secure register to generate the verification vector, and provide, to the debug port, the verification vector; and a processor, coupled to the cryptography engine, configured to instruct the cryptography engine to encrypt the random input vector of the selected authentication vector pair received by the debug port.

In another embodiment of the authenticatable integrated circuit, during authentication, the authenticatable integrated circuit is determined to be authentic when the verification vector matches the output vector of the authentication vector pair, and inauthentic when the verification vector does not match the output vector of the authentication vector pair.

In another embodiment of the authenticatable integrated circuit, the output vector of the authentication vector pair is generated by an Advanced Encryption Standard (AES) electronic code book (ECB) operation; the random input vector, output vector and verification vector are AES code blocks; the cryptography engine is an AES engine that performs the AES ECB operation; and the embedded encryption key is obfuscated using a plurality of redundant bits.

In another embodiment of the authenticatable integrated circuit, the debug port is lockable and further configured to be locked after receiving at least one of provisioning data and executable instructions.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for authenticating an integrated circuit, comprising:
   at an intellectual property (IP) facility:
      generating a random encryption key including a number of bits;
      generating a number of random input vectors, each random input vector including a number of bits;
      for each random input vector:
         encrypting the random input vector, based on the random encryption key, to generate a corresponding output vector that includes a number of bits, and
         forming the random input vector and the corresponding output vector into an authentication vector pair;
      embedding the random encryption key into hardware description language (HDL) instructions defining an integrated circuit that includes a debug port and a cryptography engine with a core coupled to a secure register that is configured to load the embedded encryption key, the secure register accessible only by the core; and
      transmitting, via a secure communication link, a number of authentication vector pairs to a semiconductor assembly and test (SAT) facility.

2. The method of claim 1, where each random input vector is encrypted using an Advanced Encryption Standard (AES) electronic code book (ECB) operation, the random input vectors are AES code blocks, the output vectors are AES code blocks, and the cryptography engine is an AES engine that performs the AES ECB operation.

3. The method of claim 2, where:
   a hardware security module (HSM) generates the random encryption key, generates the number of random input vectors, encrypts the random input vectors and forms the authentication vector pairs; and
   the random encryption key has 128 bits, each random input vector has 128 bits, and each output vector has 128 bits.

4. The method of claim 1, where the number of authentication vector pairs transmitted to the SAT facility is less than the number of random input vectors.

5. The method of claim 1, where said embedding the random encryption key includes obfuscating the random encryption key within the HDL instructions using a plurality of redundant bits.

6. The method of claim 3, further comprising deleting the random encryption key from a memory of the HSM after said embedding the random encryption key.

7. The method of claim 1, further comprising:
   at the IP facility:
      generating a Graphic Design System II (GDSII) file based, at least in part, on the HDL instructions;
   at a fabricator facility:
      securely receiving the GDSII file from the IP facility;
      generating a mask set based on the GDSII file;
      manufacturing a plurality of wafers based on the mask set, each wafer including a plurality of the integrated circuits; and
      sending at least one wafer to the SAT facility.

8. The method of claim 7, further comprising:
   at the SAT facility:
      receiving, via the secure communication link, the authentication vector pairs from the IP facility;
      receiving the wafer from the fabricator facility; and
      authenticating at least one integrated circuit on the wafer using at least one authentication vector pair.

9. A method for authenticating an integrated circuit, comprising:
   at a semiconductor assembly and test (SAT) facility:
      receiving, via a secure communication link, a number of authentication vector pairs from an intellectual property (IP) facility, each authentication vector pair including a random input vector and a corresponding output vector generated by encrypting the random input vector using a random encryption key;
      selecting one of the authentication vector pairs;
      providing the random input vector of the selected authentication vector pair to a debug port of an integrated circuit, the integrated circuit including the debug port, an embedded encryption key that matches the random encryption key, and a cryptography engine with a core coupled to a secure register that is configured to load the embedded encryption key, the secure register accessible only by the core;
      receiving a verification vector from the debug port of the integrated circuit, the verification vector generated by the cryptography engine by encrypting the random input vector of the selected authentication vector pair using the embedded encryption key; and
      determining whether the integrated circuit is authentic or inauthentic.

10. The method of claim 9, where said determining whether the integrated circuit is authentic or inauthentic includes:
    determining the integrated circuit to be an authentic integrated circuit when the verification vector matches the output vector of the selected authentication vector pair, and
    determining the integrated circuit to be an inauthentic integrated circuit when the verification vector does not match the output vector of the selected authentication vector pair.

11. The method of claim 9, where each random input vector is encrypted using an Advanced Encryption Standard (AES) electronic code book (ECB) operation, the random input vectors are AES code blocks, the output vectors are AES code blocks, the verification vector is an AES code block, and the cryptography engine is an AES engine that performs the AES ECB operation.

12. The method of claim 10, where the random encryption key has 128 bits, each random input vector has 128 bits, and each output vector has 128 bits.

13. The method of claim 9, where the embedded encryption key is obfuscated within the integrated circuit using a plurality of redundant bits.

14. The method of claim 9, further comprising provisioning the authentic integrated circuit, and locking the debug port of the integrated circuit after said provisioning.

15. The method of claim 9, further comprising:
at the intellectual property (IP) facility:
- generating the random encryption key;
- generating the random input vectors;
- generating the number of authentication vector pairs based on the random encryption key and the number of random input vectors;
- transmitting, via the secure communication link, the number of authentication vector pairs to the SAT facility, the number of authentication vector pairs being less than the number of random input vectors; and
- embedding the random encryption key into hardware description language (HDL) instructions defining the integrated circuit.

16. The method of claim 15, further comprising:
at the IP facility:
- generating a Graphic Design System II (GDSII) file based, at least in part, on the HDL instructions;

at a fabricator facility:
- securely receiving the GDSII file from the IP facility;
- generating a mask set based on the GDSII file;
- manufacturing a plurality of wafers based on the mask set, each wafer including a plurality of the integrated circuits; and
- sending at least one wafer to the SAT facility.

17. An authenticatable integrated circuit, comprising:
- an embedded encryption key;
- a debug port configured to receive a random input vector of an authentication vector pair and output a verification vector, the authentication vector pair including the random input vector and a corresponding output vector generated by encrypting the random input vector using a random encryption key that matches the embedded encryption key;
- a cryptography engine, coupled to the debug port, including a core coupled to a secure register that is configured to load the embedded encryption key, the secure register accessible only by the core, the cryptography engine configured to:
  - receive, from the debug port, the random input vector of the authentication vector pair,
  - encrypt the random input vector of the received authentication vector pair using the embedded encryption key stored in the secure register to generate the verification vector, and
  - provide, to the debug port, the verification vector; and
- a processor, coupled to the cryptography engine, configured to instruct the cryptography engine to encrypt the random input vector of the selected authentication vector pair received by the debug port.

18. The authenticatable integrated circuit of claim 17, where, during authentication, the authenticatable integrated circuit is determined to be authentic when the verification vector matches the output vector of the authentication vector pair, and inauthentic when the verification vector does not match the output vector of the authentication vector pair.

19. The authenticatable integrated circuit of claim 17, where:
- the output vector of the authentication vector pair is generated by an Advanced Encryption Standard (AES) electronic code book (ECB) operation;
- the random input vector, output vector and verification vector are AES code blocks;
- the cryptography engine is an AES engine that performs the AES ECB operation; and
- the embedded encryption key is obfuscated using a plurality of redundant bits.

20. The authenticatable integrated circuit of claim 17, where the debug port is lockable and further configured to be locked after receiving at least one of provisioning data and executable instructions.

* * * * *